United States Patent [19]

Matsuda et al.

[11] Patent Number: 4,978,424

[45] Date of Patent: Dec. 18, 1990

[54] DESCALING OF JACKETS OF GLASS-LINED INSTRUMENTS

[75] Inventors: Teruo Matsuda, Chiba; Masayoshi Miki; Hiromu Ochi, both of Ehime, all of Japan

[73] Assignee: Sumitomo Chemical Company, Limited, Osaka, Japan

[21] Appl. No.: 237,209

[22] Filed: Aug. 29, 1988

[30] Foreign Application Priority Data

Aug. 28, 1987 [JP] Japan ................................ 62-215566

[51] Int. Cl.$^5$ ............................. C23F 1/44; C23F 1/00
[52] U.S. Cl. ...................................... 156/664; 252/80; 252/79.4; 134/3; 134/22.14
[58] Field of Search ............... 156/663, 664; 252/79.2, 252/79.3, 79.4, 80; 134/3, 22.1, 22.14; 422/241

[56] References Cited

U.S. PATENT DOCUMENTS 2,868,732  1/1959  Truc .
3,404,094  10/1968  Keeney .
4,032,466  6/1977  Otrhalek et al. ...................... 134/3
4,116,713  9/1978  Otrhalek et al. ...................... 134/3

OTHER PUBLICATIONS

*Shinko Faudler Catalogue*, No. 702, "Handling and Maintenance of Glass–Steel Instruments".
Chemical Abstracts, vol. 79, No. 22, Dec. 3rd, 1973, pp. 122, 123, Abstract No. 128441t, Columbus, Ohio, U.S.A.
Chemical Abstracts, vol. 70, No. 24, Jun. 16th, 1969, p. 167, Abstract No. 108593E, Columbus, Ohio, U.S.A.
European Search Report, No. EP 88 308019.

*Primary Examiner*—David Simmons
*Assistant Examiner*—Lori-Ann Johnson
*Attorney, Agent, or Firm*—Sughrue, Mion, Zinn, Macpeak & Seas

[57] ABSTRACT

A descaling method for the inside of jackets of glass-lined instruments is disclosed, comprising using a hydrochloric acid solution comprising at least one compound selected from the group consisting of laurylamine, lauryldimethylamine and propargyl alcohol, with or without tin(II) chloride.

6 Claims, No Drawings

DESCALING OF JACKETS OF GLASS-LINED INSTRUMENTS

FIELD OF THE INVENTION

This invention relates to a descaling method for the inside of jackets of glass-lined instruments. More particularly, it relates to a descaling method to remove iron oxide base scales generated inside of a jacket by dissolving with a hydrochloric acid-based detergent to avoid breaking a lining glass due to hydrogen permeation.

BACKGROUND OF THE INVENTION

Glass-lined instruments are used with heating media such as stream, water, and heat conductive fluids passing through jackets. In a prolonged use of such jackets, however, scales based on iron oxides such as $Fe_3O_4$ and $Fe_2O_3$ generate due to corrosion, and adheres to the inside surface of the jacket. Predominant in the use at relatively low temperatures is $Fe_2O_3$, whereas $Fe_3O_4$ is more frequently observed at high temperatures. The scale reduces heat conductivity and not only leads to a considerable decrease in productivity but also increases the use of stream or cooling water. Thus, periodical descaling of the jacket inside is desired.

Known methods for descaling of the jacket inside of glass-lined instruments include physical methods using high-pressure water, and chemical methods by dissolution removal using organic acid-based detergents.

In the case of using chemical detergents such as hydrochloric acid for descaling of the jacket inside of glass-lined instruments, hydrogen generated by reaction of the acid with the metal transports through the inner lattice of the metal structure and reaches the boundary of the lining glass and the steel plate where it stays and gradually increases the pressure to finally attain a force large enough to break the glass. Thus, acid impact is feared. Accordingly, generally preferred is a physical method such as high-pressure water cleaning (see *Shinko Faudler Catalogue*, No. 702, "Handling and Maintenance of Glass-Steel Instruments").

In the case of physical cleaning methods such as high pressure water cleaning, a removable area from the open end is limited such that drilling of cleaning holes in the instrument is required. Thus, its recovery work should be made with the consumption of time and money. In addition, complete descaling cannot be expected and is less effective as compared with chemical methods. Application of chemical methods is also under way, however, those methods under trial are applicable only to scales at their initial stages of formation since they use relatively mild detergents based on such as organic acids. Generally, no effective results are anticipated when applied to practical removal of iron oxide base scale deposits.

The use of powerful detergents based on hydrochloric acid or the like may cause acid impact. Repairing of the broken lining glass due to the acid impact is difficult and also brings about a considerably large loss of opportunity. As a result, though there is needed removal of the scale to improve thermal efficiency and to increase productivity, no countermeasures are taken in the practical use.

As a solution to the above problems, the present inventors have made extensive investigations on methods to easily remove iron oxide base scales generated inside jackets of glass-lined instruments without giving any damage to glass linings, and found that a hydrochloric acid solution containing specific compounds is effective enough to remove the scales free from any acid impact.

SUMMARY OF THE INVENTION

The present invention relates to a method for descaling inside of jackets of glass-lined instruments by using hydrochloric acid containing at least one compound selected from the group consisting of laurylamine, lauryldimethylamine and propargyl alcohol, with or without tin(II) chloride.

DETAILED DESCRIPTION OF THE INVENTION

The glass-lined instruments referred to in the present invention include glass-lined, jacket-equipped reaction vessels, polymerization vessels and conduits.

The hydrochloric acid solution used in the present invention comprises at least a compound selected from the group consisting of laurylamine, lauryldimethylamine and propargyl alcohol, with or without tin(II) chloride. Preferable among them is a hydrochloric acid solution containing laurylamine, propargyl alcohol, and tin(II) chloride because it is the lowest in both of the corrosion rate of the matrix and the hydrogen permeation rate and is high in dissolution rate of the scale. Laurylamine and lauryldimethylamine (referred to as laurylamines hereinafter) readily dissolve into hydrochloric acid if their hydrochlorides or like inorganic salts are employed. Free amines, on the other hand, are not easily dissolved. Therefore, it is desired to beforehandedly dissolve the amine into a surfactant such as diethylene glycol and then mix with hydrochloric acid.

At least a compound selected from laurylamine, lauryldimethylamine and propargyl alcohol should be added to the aqueous hydrochloric acid solution in an amount about 50 to 1,000 ppm, preferably 100 to 500 ppm. The corrosion rate of the matrix and the hydrogen permeation rate are both increased when the concentration is lower than about 50 ppm. Concentration exceeding about 1000 ppm is not effective since the effect is not so improved with an increase of concentration. Moreover, a large amount of the surfactant is necessary to dissolve laurylamines, and also, inconveniences such as deposition of laurylamines are encountered.

It is not necessary to dissolve propargyl alcohol itself or laurylamines themselves to hydrochloric acid, but may be incorporated into chemicals comprising them as components.

It is possible to remove the scale while depressing the corrosion of the matrix and acid impact without the aid of tin(II) chloride, however, the addition of tin(II) chloride further decreases the corrosion and promotes the scale dissolution.

A suitable amount of tin(II) chloride added to the aqueous hydrochloric acid solution is about 0.1 to 0.5%, preferably 0.5 to 3%. Addition of less than about 0.1% gives a small effect, and addition exceeding about 5% is not so effective in that an effect expected from the concentration is not attained.

An appropriate concentration of hydrochloric acid is chosen in the range of from about 5 to 15% depending on the adhesion state of the scale. The dissolution rate of the scale is approximately proportional to the concentration of hydrochloric acid, however, the rate is decreased in concentrations lower than about 5%. A concentration exceeding about 15% has no problem in the scale removal, however, it is not desired since hydrochloric acid fume generation increases and a demand for countermeasures newly arises.

Sulfuric acid has a less descaling ability and is thus undesirable. Nitric acid is also undesirable since it increases the corrosion of the matrix. Mineral acids such as sulfuric acid and phosphoric acid, or corrosion preventives commonly used for descaling may also be incorporated in the hydrochloric acid solution.

The dissolution rate is approximately proportional to the temperature of descaling. The descaling temperature is not especially restricted but is determined while taking into consideration the amount of the scale and the concentration of hydrochloric acid. Normally, it is set at about 40° to 70° C. The descaling rate is decreased at temperatures lower than about 40° C., whereas the corrosion of the matrix is increased at temperatures higher than about 70° C.

Descaling is normally performed by circulating the cleaning solution inside the jacket. Generally, the initial solution as it is circulated to the end. Hydrochloric acid, propargyl alcohol or laurylamines, or tin(II) chloride may be added in case of need, such as when the acid concentration is decreased.

Descaling is normally performed for about 2 to 6 hours, but may be changed depending on the adhesion state of the scale.

No breakage by acid impact occurs under the above-specified conditions, however, the detection of hydrogen permeating the matrix to the glass side is difficult. Therefore, hydrogen permeated to the outer surface of the jacket may be monitored. It is safer to monitor the hydrogen on the jacket side since normally, jackets are thinner than the matrix and higher hydrogen permeation is obtained on the jacket side.

The cleaning solution is drained from the jacket after descaling is finished. The jacket is then rinsed, neutralized with alkalis, rinsed again, and reused to effect the reaction.

The present invention is now illustrated in greater detail with reference to non-limiting Examples. cl REFERENCE EXAMPLE 1

Dissolution states were investigated for scale components $Fe_3O_4$ and $Fe_2O_3$, and for a scale collected from the inside of a jacket of a glass-lining-made reaction vessel.

Two grams of $Fe_2O_3$, $Fe_3O_4$, or the scale was fed into 50 ml of a 10% HCl solution in a flask, kept at 60° C., and stirred. Solutions were collected at a constant time interval and analyzed for the Fe ion concentration. The results are given in Table 1.

REFERENCE EXAMPLE 2

The results obtained in Reference Example 1 revealed that $Fe_2O_3$ was slightly soluble in the HCl solution. Thus, $Fe_2O_3$ was investigated under various temperatures and HCl concentrations (the amount of $Fe_2O_3$ feed was decreased to 1 g for tests under varied HCl concentrations), whereas other samples were subjected to tests under the same conditions as in Reference Example 1. The results are given in Tables 2 and 3.

REFERENCE EXAMPLE 3

Hydrogen permeation rate and peeling of a glass lining were separately measured since their relationship cannot be directly measured.

One side of a soft steel plate was brought into contact with a 10% hydrochloric acid solution at 60° C. to effect corrosion, and the amount of hydrogen generated and reached to the other side by permeation was measured. The hydrogen permeation rate was measured by the glycerol substitution method (*Boshoku-Gijutsu*, 26, 504 (1977)) at a contact area of 7.07 cm², from the values obtained after 3 and 6 hours. The results are given in Table 4.

A glass-lined steel plate (100×100 mm²) was similarly tested with a 10% hydrochloric acid solution (at a contact area of 7.07 cm²), and the time elapsed was measured until the peeling off due to permeated hydrogen occurred. The results are given in Table 5.

Though not unequivocal since the hydrogen permeation rate of the glass-lined steel plate differs in a strict sense from that of the plate having no linings, peeling of glass seemingly occurs at a hydrogen stay of about 30 to 40 ml per m² of the lined surface area.

REFERENCE EXAMPLE 4

Hydrogen permeation rate was measured in the same manner as in Reference Example 3 on a 1 mm-thick soft steel plate using cleaning solutions based on a 10% hydrochloric acid solution with changing additives. The Fe concentration of the solution was simultaneously measured to obtain a corrosion rate. The results are given in Table 6.

REFERENCE EXAMPLE 5

This example was essentially the same as in Reference Example 4, except that the additives were changed in amounts or were used as mixtures thereof. The results are given in Table 7.

REFERENCE EXAMPLE 6

A glass-lined test piece (a 3 mm-thick steel plate having a 1.5 mm-thick glass lining) was brought into contact at 60° C. with cleaning solutions shown in Table 7 on the steel side. No glass peeling occurred after 100 hours except for Pieces No. 1 and No. 4.

REFERENCE EXAMPLE 7

The effect of tin(II) chloride on the dissolution of the scale was investigated on a scale collected from the inside of a jacket of a glass-lined polymerization vessel.

The same method as in Reference Example 1 was followed, except that a 10% hydrochloric acid solution comprising 200 ppm of propargyl alcohol, 100 ppm of laurylamine (900 ppm of diethylene glycol), and tin(II) chloride was employed. The results are given in Table 8.

REFERENCE EXAMPLE 8

The effects of tin(II) chloride on corrosion rate of the matrix and on hydrogen permeation rate were investigated.

A 10% hydrochloric acid solution comprising 200 ppm of propargyl alcohol, 100 ppm of laurylamine (900 ppm of diethylene glycol), and tin(II) chloride was prepared and allowed to react with a 1.5 mm-thick soft steel plate to measure the corrosion rate of the matrix and the hydrogen permeation rate in the same method as in Reference Example 4. The results are given in Table 9.

EXAMPLE 1

An iron oxide base scale (with an estimated adhesion of about 20 kg and average scale thickness of 2 mm) generated on a glass lined reaction vessel (a soft steel thickness of the glass-lined side being 9 mm) having a body internal volume of 500 l and a jacket internal volume of about 160 l was removed by steps as follows.

Laurylamine was dissolved into diethylene glycol, and the solution was added to hydrochloric acid to give 250 l of a 10% aqueous hydrochloric acid solution comprising 200 ppm of laurylamine (with 0.5% of diethylene glycol). The solution maintained at 60° C. was fed to the jacket side and circulated for 5 hours to effect the cleaning.

The hydrogen permeation rate measured with a measuring apparatus attached to a part of the outer wall (having a plate thickness of 5 mm) of the jacket was 1 ml/m$^2$·hr or less.

Cleaning was stopped after 5 hours, followed by thoroughly rinsing (an alkali neutralization treatment included). A sound glass surface was obtained after the cleaning and megascopic observation revealed that about 100% of the scale was removed from the inside wall of the jacket.

The total thermal conductivity of 152.6 kcal/m$^2$·hr·° C. before cleaning was 29.5% improved to give 197.7 kcal/m$^2$·hr·° C. after cleaning.

EXAMPLE 2

A scale (with an estimated adhesion of about 140 to 150 kg) containing approximately equal amounts of $Fe_3O_4$ and $Fe_2O_3$ generated on a jacket of a glass-lined reaction vessel having a body internal volume of 6 m$^3$ and a jacket internal volume of about 1 m$^3$ was cleaned by a method as follows.

1.5 m$^3$ of a 10% aqueous hydrochloric acid solution comprising 100 ppm of laurylamine and 100 ppm of propargyl alcohol (with 0.5% of diethylene glycol) was prepared and circulated over the jacket for 5 hours with the solution temperature maintained at 60° C.

The hydrogen permeation rate was measured 1 ml/m$^2$·hr or less with an apparatus being attached to a part of the outside wall of the jacket.

After cleaning for 5 hours was finished, thorough rinsing (an alkali neutralization treatment included) was performed. A sound glass surface was obtained and megascopic observation revealed that about 100% of the scale was removed from the inside wall of the jacket.

The total thermal conductivity of 132.2 kcal/m$^2$·hr·° C. before cleaning was 28.3% improved to give 69.6 kcal/m$^2$·hr·° C. after cleaning.

EXAMPLE 3

A scale (with an estimated adhesion of about 90 kg) based on iron oxides generated on a jacket of a glass-lined reaction vessel (a soft steel thickness of the glass-lined side being 12 mm) having a body internal volume of 14 m$^3$ and a jacket internal volume of about 1.7 m$^3$ was removed by steps as follows.

Laurylamine was dissolved in diethylene glycol, and the solution was added to hydrochloric acid to give 2.8 m$^3$ of an aqueous 10% hydrochloric acid solution comprising 100 ppm of laurylamine (with 900 ppm of diethylene glycol), 200 ppm of propargyl alcohol, and 0.5% of tin(II) chloride. The resulting solution maintained at 60° C. was fed to the jacket side to effect cleaning by circulating for 3.5 hours.

The hydrogen permeation rate was measured 1 ml/m$^2$·hr or less with an apparatus attached to a part of the outside jacket wall having a plate thickness of 5 mm.

After cleaning for 3.5 hours was finished, through rinsing (an alkali neutralization treatment included) was performed. A sound glass surface was obtained and megascopic observation revealed that about 100% of the scale was removed without any corrosion of the matrix.

The total thermal conductivity of 244 kcal/m$^2$·hr·° C. was 53% improved to give 375 kcal/ml$^2$·hr·° C. after cleaning.

EXAMPLE 4

An iron oxide base scale (with an estimated adhesion of about 30 kg) generated on a glass-lined reaction vessel having a body internal volume of 2.6 m$^3$ and a jacket internal volume of 0.5 m$^3$ was removed by steps as follows.

Laurylamine was dissolved into diethylene glycol, and the solution was added to hydrochloric acid to give 3 m$^3$ of a 10% aqueous hydrochloric acid solution comprising 120 ppm of laurylamine (with 1000 ppm of diethylene glycol), 230 ppm of propargyl alcohol, and 0.8% of tin(II) chloride. The resulting solution maintained at 60° C. was fed to the jacket side and circulated for 3 hours to effect the cleaning.

After cleaning for 3 hours was finished, thorough rinsing (an alkali neutralization treatment included) was performed. A sound glass surface was obtained and megascopic observation revealed that approximately 100% of the scale was removed without any corrosion of the matrix.

The total thermal conductivity of 250 kcal/m$^2$·hr·° C. before cleaning was 30% improved to give 327 kcal/m$^2$·hr·° C. after cleaning.

TABLE 1

| Duration (hr) | $Fe_3O_4$ Fe concentration (%) | $Fe_3O_4$ Dissolution ratio (%) | $Fe_2O_3$ Fe concentration (%) | $Fe_2O_3$ Dissolution ratio (%) | Actual scale Fe concentration (%) | Actual scale Dissolution ratio (%) |
|---|---|---|---|---|---|---|
| 0.5 | 1.5 | 52 | 0.6 | 21 | 0.6 | 24 |
| 2.0 | 2.6 | 90 | 1.4 | 50 | 1.4 | 56 |
| 4.0 | 2.9 | 100 | 1.7 | 61 | 1.8 | 72 |

TABLE 2

| Duration (hr) | 40° C. Fe concentration (%) | 40° C. Dissolution ratio (%) | 50° C. Fe concentration (%) | 50° C. Dissolution ratio (%) | 60° C. Fe concentration (%) | 60° C. Dissolution ratio (%) |
|---|---|---|---|---|---|---|
| 1.0 | 0.2 | 7 | 0.5 | 21 | 1.0 | 34 |
| 2.0 | 0.4 | 14 | 0.9 | 30 | 1.4 | 48 |
| 4.0 | 0.8 | 28 | 1.5 | 51 | 2.0 | 69 |

TABLE 3

| Duration (hr) | HCl: 2.5% Fe concentration (%) | HCl: 2.5% Dissolution ratio (%) | HCl: 5% Fe concentration (%) | HCl: 5% Dissolution ratio (%) | HCl: 10% Fe concentration (%) | HCl: 10% Dissolution ratio (%) |
|---|---|---|---|---|---|---|
| 1.0 | 0.12 | 9 | 0.25 | 18 | 0.62 | 44 |
| 2.0 | 0.17 | 12 | 0.39 | 28 | 0.80 | 57 |
| 4.0 | 0.23 | 16 | 0.58 | 41 | 1.02 | 73 |

TABLE 4

| | Soft steel plate thickness (mm) | | | | |
|---|---|---|---|---|---|
| | 1 | 2 | 3 | 4 | 5 |
| Hydrogen permeation rate (ml/m² · hr) | 244 | 42 | 15 | 7 | 3 |

TABLE 5

| No. | Test piece Steel plate thickness (mm) | Test piece Glass thickness (mm) | Elapse of time before glass peeling (hr) |
|---|---|---|---|
| 1 | 3 | 1.5 | 4 to 5 |
| 2 | 8 | 1.5 | 12 to 15 |

TABLE 6

| No. | Additive Kind | Additive Concentration (ppm) | Diethylene glycol (%) | Corrosion rate (g/m² · hr) | Hydrogen permeation rate (ml/m² · hr) |
|---|---|---|---|---|---|
| 1 | Laurylamine | 100 | 0.5 | 5.9 | 2.2 |
| 2 | Lauryldimethylamine | 100 | 0.5 | 30.9 | 11.9 |
| 3 | Propargyl alcohol | 200 | — | 5.2 | 2.5 |
| 4 | Butylamine | 100 | 1.0 | 242 | 193 |
| 5 | Hexylamine | 100 | 1.0 | 228 | 189 |
| 6 | Octylamine | 100 | 1.0 | 218 | 180 |
| 7 | Decylamine | 200 | 1.0 | 203 | 181 |
| 8 | Hexamethylenediamine | 200 | 2.0 | 186 | 172 |
| 9 | Hexamethylenetetramine | 200 | 2.0 | 39.3 | 32 |
| 10 | Benzyl chloride | 200 | 2.0 | 218 | 178 |
| 11 | Dichloroethane | 200 | — | 232 | 188 |
| 12 | — | — | — | 351 | 252 |

TABLE 7

| No. | Additive Kind | Additive Concentration (ppm) | Diethylene glycol (%) | Corrosion rate (g/m² · hr) | Hydrogen permeation rate (ml/m² · hr) |
|---|---|---|---|---|---|
| 1 | Laurylamine | 50 | 0.25 | 39.9 | 12.7 |
| 2 | Laurylamine | 200 | 1.0 | 3.2 | 2.3 |
| 3 | Laurylamine | 400 | 2.0 | 3.3 | 2.5 |
| 4 | Lauryldimethylamine | 50 | 0.25 | 51.6 | 16.3 |
| 5 | Lauryldimethylamine | 200 | 1.0 | 19.6 | 5.8 |
| 6 | Lauryldimethylamine | 400 | 2.0 | 9.5 | 3.2 |
| 7 | Laurylamine / Lauryldimethylamine | 50 / 100 | 0.75 | 9.6 | 3.9 |
| 8 | Laurylamine / Propargyl alcohol | 50 / 100 | 1.0 | 3.2 | 2.3 |
| 9 | Laurylamine / Propargyl alcohol | 100 / 50 | 1.0 | 1.9 | 1.5 |
| 10 | Laurylamine / Propargyl alcohol | 100 / 100 | 1.0 | 1.2 | 1.1 |

TABLE 8

| Duration | Fe concentration (%) | |
|---|---|---|
| (hr) | $SnCl_2$ 0.5% | $SnCl_2$ 0.0% |
| 1 | 1.11 | 0.89 |
| 2 | 1.50 | 1.19 |
| 3 | 1.90 | 1.24 |
| 4 | 1.95 | 1.30 |

TABLE 9

| | Corrosion rate: $g/m^2 \cdot hr$ | | |
|---|---|---|---|
| $SnCl_2$ Concentration (%) | $Fe^{3+}$ concentration in hydrochloric acid (0%) | $Fe^{3+}$ concentration in hydrochloric acid (0.18%) | Hydrogen permeation rate $(ml/m^2 \cdot hr)$ |
| 0.5 | 1.0 | 1.2 | 0.0 |
| 0.0 | 1.2 | 7.5 | 0.5 |

While the invention has been described in detail and with reference to specific embodiments thereof, it will be apparent to one skilled in the art that various changes and modifications can be made therein without departing from the spirit and scope thereof.

What is claimed is:

1. A method for removing the scales from the inner steel surface of jackets of glass-lined instruments, comprising contacting said inner steel surface with an effective amount of a hydrochloric acid solution comprising at least one compound selected from the group consisting of laurylamine, lauryldimethylamine and propargyl alcohol to descale said inner steel surface.

2. A method of claim 1, wherein the concentration in the hydrochloric acid solution of said at least one compound selected from the group consisting of laurylamine, lauryldimethylamine and propargyl alcohol is from 50 to 1,000 ppm.

3. A method of claim 1, wherein the concentration of hydrochloric acid solution is from 5 to 15%.

4. A method of claim 1, wherein the cleaning temperature is from 40° to 70° C.

5. A method for removing the scales from the inner steel surface of jackets of glass-lined instruments, comprising contacting said inner steel surface with an effective amount of a hydrochloric acid solution comprising at least one compound selected from the group consisting of laurylamine, lauryldimethylamine and propargyl alcohol, with tin(II) chloride to descale said inner steel surface.

6. A method claim 5, wherein the concentration of tin(II) chloride in the hydrochloric acid solution is from 0.1 to 5%.

* * * * *